United States Patent [19]

Miazga et al.

[11] Patent Number: 4,691,317

[45] Date of Patent: Sep. 1, 1987

[54] FEATURE DESELECT CONTROL

[75] Inventors: Dennis E. Miazga, Fairport; James J. Petery, Webster, both of N.Y.

[73] Assignee: Xerox Corporation, Stamford, Conn.

[21] Appl. No.: 784,144

[22] Filed: Oct. 4, 1985

[51] Int. Cl.[4] .............................................. G06F 11/00

[52] U.S. Cl. ........................................ 371/20; 371/16; 371/29

[58] Field of Search ........................ 371/16, 20, 29, 21, 371/25; 364/200, 900

[56] References Cited

U.S. PATENT DOCUMENTS

| | | | |
|---|---|---|---|
| 3,944,794 | 3/1976 | Reehil et al. . | |
| 4,130,354 | 12/1978 | Steiner . | |
| 4,338,023 | 7/1982 | McGibbon . | |
| 4,377,845 | 3/1983 | Markham | 371/16 |
| 4,477,901 | 10/1984 | Braband | 371/20 |
| 4,499,581 | 2/1985 | Miazge | 371/20 |
| 4,514,846 | 4/1985 | Federico | 371/20 |
| 4,617,661 | 10/1986 | Futaki | 371/20 |

*Primary Examiner*—Michael R. Fleming
*Attorney, Agent, or Firm*—Ronald F. Chapuran

[57] ABSTRACT

The present invention is concerned with a method of deselecting the features of a xerographic printing machine to be able to continue operation of the machine even though a fault has been detected. In particular, the control isolates a detected malfunction to a particular input or output, determines that the particular input or output is related to a specific machine feature that has been selected for a particular job requirement, and instructs the operator by message to deselect that particular feature for continued machine operation. In the event that the isolated fault is related to a machine feature that has not been selected for the particular job requirement or that is not in that particular machine configuration, the control ignores the indicated fault for the continued operation of the machine.

6 Claims, 3 Drawing Figures

FEATURE DESELECT CONTROL

This invention relates to an electronic control, in particular, to a control to a control for a xerographic printing machine having a feature deselect capability.

Jam recovery systems and techniques are well known in the prior art, for example, U.S. Pat. No. 3,944,794 Reehil et al. shows a reproduction machine control having the means to automatically recover from a jam or machine malfunction using a plurality of counters to reprogram the system to make up for copies lost as well as copies remaining on the original job requirement. U.S. Pat. No. 4,130,354 Steiner teaches a job recovery technique in a reproduction machine having a duplexing feature to automatically adjust the reproduction process in order that the selected number of copies are ultimately produced even though some copies may have been lost due to the malfunction. U.S. Pat. No. 4,338,023 McGibbon discloses a method of job recovery in a production machine having various machine resources such as an automatic document handler tray, a finisher station tray, a dedicated duplex tray, and main and auxiliary paper feed trays. Various levels or hierarchies of job recovery using different resources are taught.

It is also known, as disclosed in pending application D/82188, U.S. Ser. No. 420,999 filed Sept. 21, 1982 to be able to selectively reset a single processor in a multiprocessor control system. Thus, any type of abnormal operation in any one of the processors or control boards, will not necessarily force all the other control boards to be reset. Resetting all the control boards could cause the unnecessary loss of status and operating information. It is also known, as disclosed in pending application D/82187, U.S. Ser. No. 421,965 filed Sept. 1, 1982 that the failure of one control board or processor in a multi-processor system to reset, does not necessarily inhibit machine operation. In particular, if the particular control board or processor failing reset is not critical to the overall machine operation, the machine continues operation.

A difficulty with the prior art reset systems however, is that the systems isolated the malfunction broadly to a control board with no options available for operator intervention to continue operation. It would be desirable, therefore, to be able to specifically identify the source or cause of a system malfunction and to relate the malfunction to a particular job requirements or machine configuration to determine what specific type of further machine operation is possible.

It is, therefore, an object of the present invention to provide a new and improved fault isolation control. It is a further object of the present invention to be able to detect switch and sensor failure and output driver failure on control boards and to be able to isolate the exact input or output related to the defects. It is still another object of the present invention to be able to isolate the machine defects and to be able to bypass the machine defects with or without operator invention to be able to continue machine operation. It is another object of the present invention to provide fault code numbers relating to the input or output malfunctions that are displayed to provide diagnostic information for a service representative at a remote location before servicing the machine or locally at the time of servicing the machine.

Further advantages of the present invention will become apparent as the following description proceeds and the features characterizing the invention will be pointed out with particularity in the claims annexed to and forming a part of this specification.

Briefly, the present invention is concerned with a method of deselecting the features of a xerographic printing machine to be able to continue operation of the machine even though a fault has been detected. In particular, the control isolates a detected malfunction to a particular input or output, determines that the particular input or output is related to a specific machine feature that has been selected for a particular job requirement, and instructs the operator by message to deselect that particular feature for continued machine operation. In the event that the isolated fault is related to a machine feature that has not been selected for the particular job requirement or that is not in that particular machine configuration, the control ignores the indicated fault for the continued operation of the machine.

For a better understanding of the present invention, reference may be had to the accompanying drawings wherein the same reference numerals have been applied to like parts and wherein.

Figure 1:
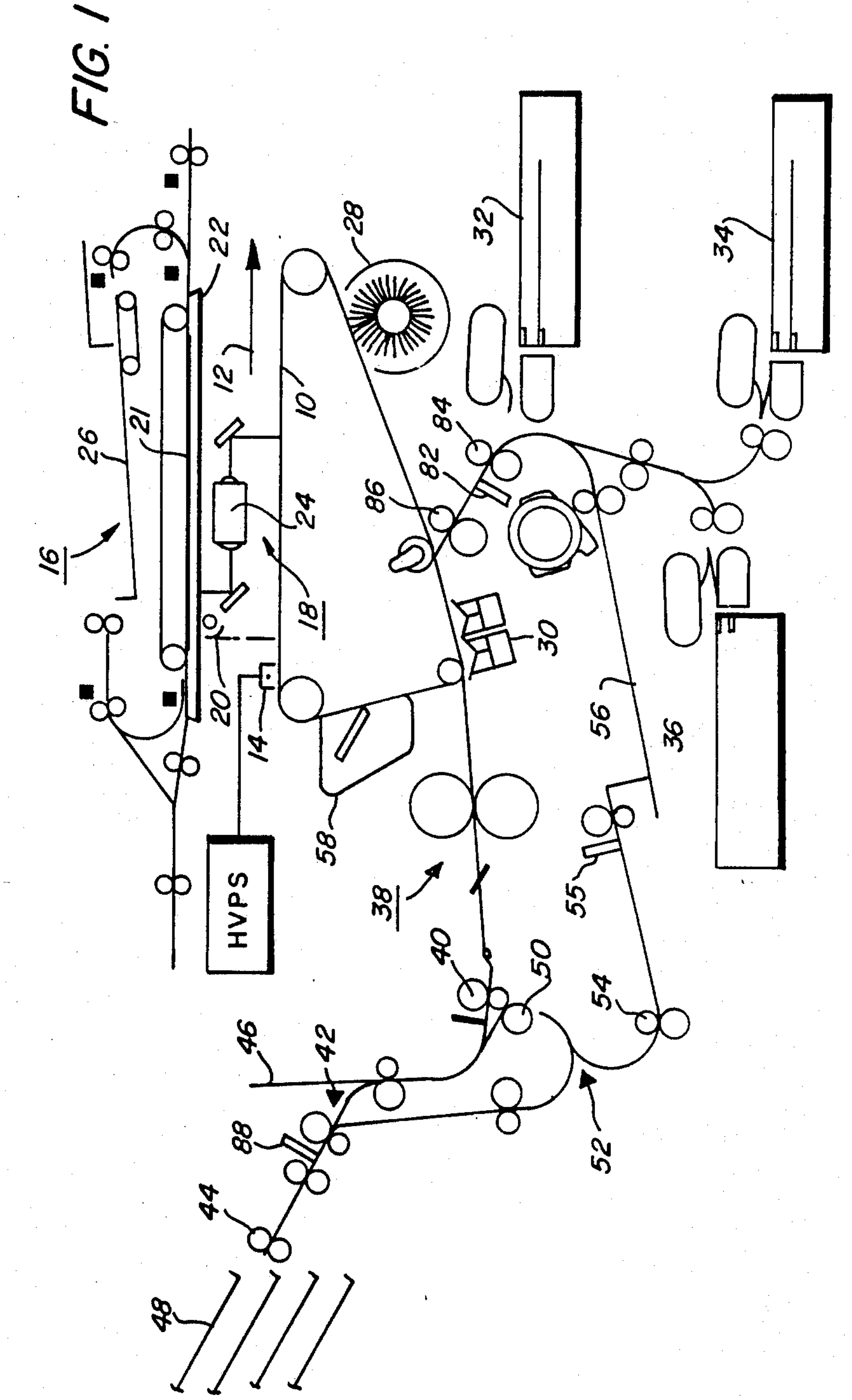
FIG. 1 is an elevational view of a reproduction machine that can be controlled in accordance with the present invention.

With reference to FIG. 1, there is shown an electrophotographic printing or reproduction machine employing a belt 10 having a photoconductive surface. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charged portion of the photoconductive surface is then advanced through an imaging station. At the imaging station, a document handling unit 16 positions an original document face down a platen 21 over exposure system 22. The exposure system 22 includes lamp 20 illuminating the document 16 positioned on transparent platen 18. The light rays reflected from document positioned on transparent platen 22. The light rays reflected from the document are transmitted through lens 24. Lens 24 focuses the light image of the original document onto the charged portion of the photoconductive surface of belt 10 to selectively dissipate the charge. This records an electrostatic latent image on the photoconductive surface corresponding to the informational areas contained within the original document.

Document handling unit 16 sequentially feeds documents from a holding tray, 26, in seriatim, to platen 22. The document handling unit recirculates documents back to the stack supported on the tray. Thereafter, belt 10 advances the electrostatic latent image recorded on the photoconductive surface to a development station.

At the development station a magnetic brush developer roller 28 advances a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions onto the backside of the copy sheet. This attracts the toner powder image from the photoconductive surface of belt 10 to the sheet.

There is shown 3 copy sheet trays, 33, 34, and 36 for supplying copy sheets to be driven by drives 74, 76, and 78 to the transfer station at the photoreceptor belt. In a preferred embodiment tray 32 holds 1100 $8\frac{1}{2}\times 11$ inch cut sheets, tray 34 holds 600 $8\frac{1}{2}\times 11$ inch cut sheets, and tray 36 holds 600 sheets with a variable size of $5\frac{1}{2}\times 8\frac{1}{2}$ inch to $11\times 17$ inch. Sheets from each of these copy trays are pulled onto the associated drives by associated vacuum feed heads as illustrated. In addition, there is a duplex tray having sheets driven by a bottom vacuum corrugated feeder onto the associated drive rollers 80.

There is a pre-registration switch 82 for sensing the presence of copy sheets at a pre-registration station. The pre-registration drive rollers and each of the drivers associated with a copy sheet trays are driven by a (not shown) servo motor. Registration drive rolls 86 are braked and started via a (not shown) clutch connected to a clutch motor. Following transfer, the sheets are driven to the fuser station 38 and through suitable drive rolls past exit switch 88 to an output tray. The output tray can be sorter bins or a compiler station for finishing. The output tray can be an output catch tray.

The copy sheets are fed from a selected one of trays 32, 34, or 36 to a transfer station. After transfer, sheets are advanced to a fusing station. The fusing station includes a fuser assembly for permanently affixing the transferred powder image to the copy sheet. Preferably, fuser assembly 38 includes a heated fuser roller and back-up roller with the sheet passing between fuser roller and back-up roller.

After fusing, conveyor 40 transports the sheets to gate 42 which functions as an inverter selector. Depending upon the position of gate 42, the copy sheets will either be deflected to output tray 48 over drive rolls 44 or driven up the transport 46. If a sheet is driven onto transport 46, the trailing edge of the sheet upon passing drive rolls 40, drops into engagement with drive rolls 500. At this point, the sheet will be driven to gate 52. Decision gate 52 deflects the sheet directly into output tray 48 in an inverted mode or deflects the sheets into a duplex inverter roll transport 54 to duplex tray 56. Duplex tray 56 provides intermediate or buffer storage for those sheets which have been printed on one side for printing on the opposite side. In order to complete duplex copying, the previously simplexed sheets in tray 56 are fed in seriatim back to the transfer station for transfer of the toner powder image to the opposed side of the sheet. Invariably, after the copy sheet is separated from the photoconductive surface of belt 10, some residual particles remain adhering to belt 10. These residual particles are removed from the photoconductive surface thereof at a cleaning station 58.

Figure 2:
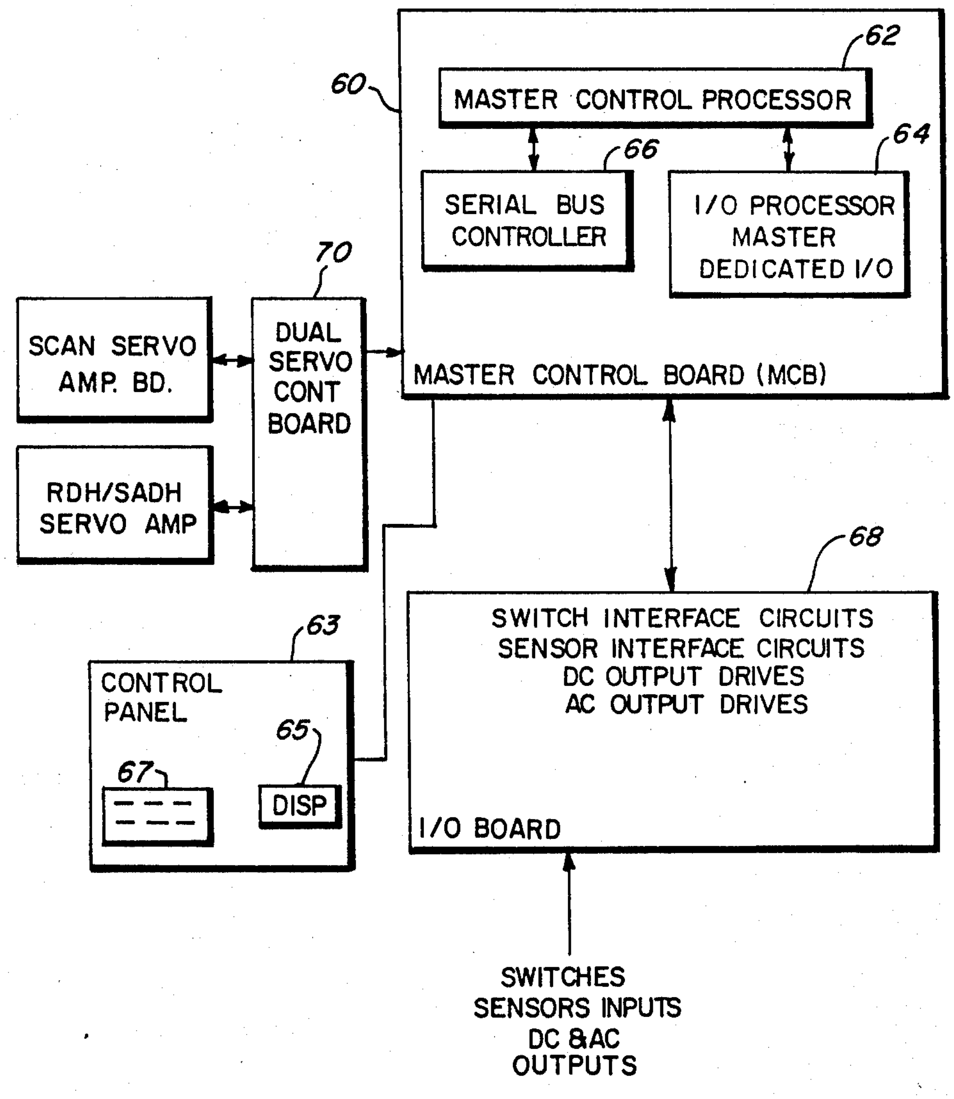
FIG. 2 is a block diagram of the control for the machine as illustrated in FIG. 1.

With reference to FIG. 2, there is illustrated the general control of the xerographic printing machine, in particular, a master control board 60, including an Intel 8085 master control processor 62, an Intel 8085 input/output processor 64 and a serial bus controller 66 connected to an input/output board 68 including various switch and sensor interface circuits and DC and AC output drivers. In a preferred embodiment the master control processor includes 80K ROM, 8K RAM, AD and DA converters and an 8253 timer and 8259 interrupt controller, as well as suitable input and output ports. The master control board 70 is also connected to a dual servo control board over a serial bus for handling scan and document handling servos. Also connected to the master control board 60 is a control panel 63 with suitable display 65 and keyboard 67 for entering program data and displaying control and diagnostic information. The program data configures the machine to use selected features in completing a job requirement. For example, the machine could be configured to provide duplex copies at a selected magnification ratio or to use the recirculating document handler to produce simplex copies.

In accordance with the present invention, there is a detection of the location of a malfunction in order to determine whether or not the machine can be operated with or without the particular feature. The malfunction could be circuitry on a printing wiring board or could be connectors and harnessing or devices attached to harnessing that causes an error to show up on the printed wiring board. In general, the inputs and outputs at the input/output board 68 are tested. For example, it could be determined that the on-board circuity or the harness related to a jam switch is faulty. The decision is made, then, whether or not the circuity is required to make any of the copies in the required job. If yes, there is a shutdown. If no, the machine continues to run without the faulty circuitry. If the machine cannot run, there is generally displayed to the operator a message "Call for Service". If the machine can run there is no message unless there is an attempt to use the malfunctioning feature. For example, if one of the paper trays is malfunctioning and the operator attempts to use that particular paper tray, the machine will instruct the operator to select another tray and also to call for service.

Each input/output has a unique input/output code number that is available for display to the tech rep. Also, the machine components can be broken down into different categories relating to the availability of the machine. For example, if the malfunction is in the driver for the lens 24, the lens is crucial in all machine configurations and therefore a malfunction of the driver for the lens will cause a shutdown of the machine for all job requirements. Another output device is the restart motor to remove copies on the platen 21 back to the RDH recirculating document handler tray 26. This feature is only in configurations using the recirculating document handler. Therefore, if there is a malfunction in the RDH, the first question is whether or not the RDH has been selected. If not selected, the machine then can continue operation and there is no message. If the RDH has been selected, then there is an indication to deselect this particular feature. Other outputs such as the driver for an elevator motor on one of the paper trays 32, 34 or 38 will only inhibit the use of that particular paper tray and a machine can be reconfigured to operate with other paper trays. There are also many inputs monitored such as the sensor to monitor sheets into the duplex tray 56. In this particular situation, if there is a malfunction at this location, an error will be indicated if the duplex operation is attempted and a message will instruct the operator to reconfigure the machine or defeature the machine away from duplex operation. The various fault numbers associated with each of these malfunctions are available to the operator to be able to call in remotely to the tech rep. This enables the tech rep to be able to anticipate corrective action and bring the required components on the first service call.

Figure 3:
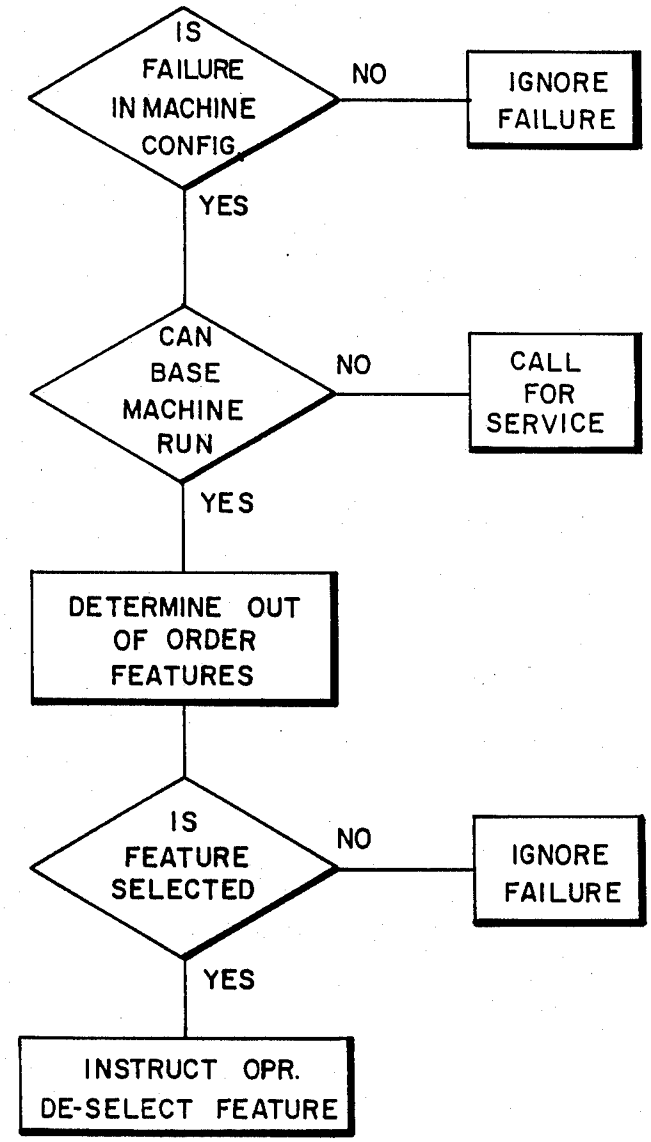
FIG. 3 is a flow chart illustrating the feature deselect control in accordance with the present invention.

With reference to the flow chart in FIG. 3, after a detection of a malfunction, the first question is whether or not the detected malfunction or failure is in the machine configuration. That is, it is possible that the machine could register an error signal for a component that is not a part of that particular machine configuration. For example, if the malfunction is in the recirculating document handler, the question is whether or not the RDH is in machine configuration. If not, the malfunction indication is ignored.

If the indicated malfunction is part of the machine configuration to perform the job requirement, the next question is whether or not the malfunction is necessary to the basic machine operation. For example, the drive for the system lens. If it is necessary, the machine cannot be run and there will be a message to call for service. There are many inputs and outputs that are essential for basic machine operation and therefore fall within this category. Other examples of outputs are relay to turn the fuser on and off, the exposure lamp control, and the print and power-up drivers. Other examples of inputs are the various jam switches and scanning optics posisiton sensors.

If the indicated malfunction is not needed for basic machine operation, then there is a determination as to what features are inoperative and whether or not the feature has been selected. If the feature has not been selected, the malfunction is ignored and there is no message. However, if the feature associated with the malfunction has been selected, there will be a message to the operator to deselect this particular feature. The machine will then be able to operate in any configuration not affected by the malfunction once the operator deselects the malfunctioning feature. There are also many other examples of inputs and outputs in this category. For example the inoperation of the vacuum feed for the duplex tray will result in the deselection of duplex operation. However, the machine will be able to complete any requirement not needing a duplex output.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. In a xerographic printing machine having a photoreceptor and a plurality of operating components cooperating with one another to produce images on support material, the operating components cooperating in various configurations to produce the images, and including a control panel providing an operator with the means to select the various machine features, various combinations of the features providing different machine configurations, some of the features being essential to producing images on the support material, other of the features only being essential in selected configurations to produce images on the support material, and a control having a fault location segment to identify machine malfunctions, the method of defeaturing the machine to continue operation upon the detection of a fault by the control comprising the steps of:

recognizing the existence of a machine malfunction in the control, isolating the malfunction to a particular machine feature in a particular machine configuration, determining that the malfunction is not essential to the production of images on copy sheets in all machine configurations, determining that the machine feature associated with the identified malfunction has been selected by the operator at the control panel, and providing a message on a display at the control panel to deselect the machine feature associated with the identified malfunction.

2. The method of claim 1 including the steps of:

determining that the detected malfunction is not in the machine configuration and ignoring the detected malfunction.

3. The method of claim 1 including the steps of:

determining that the feature manifesting the associated malfunction has not been selected by the operator at the control panel, and ignoring the manifestation of the machine malfunction and continuing machine operation.

4. The method of claim 1 including the step of providing a message at the control panel to call a service representative.

5. The method of claim 1 including the step of providing at the control panel a fault number to assist in the diagnosis of the machine fault.

6. The method of claim 1 including the steps of:

entering a diagnostic mode to further isolate the source of the malfunction in response to the fault code displayed.

* * * * *